Aug. 26, 1924.  
P. W. KNAUF  
GEAR ACTUATED VALVE  
Filed Jan. 19, 1920  
1,506,433  
3 Sheets-Sheet 2

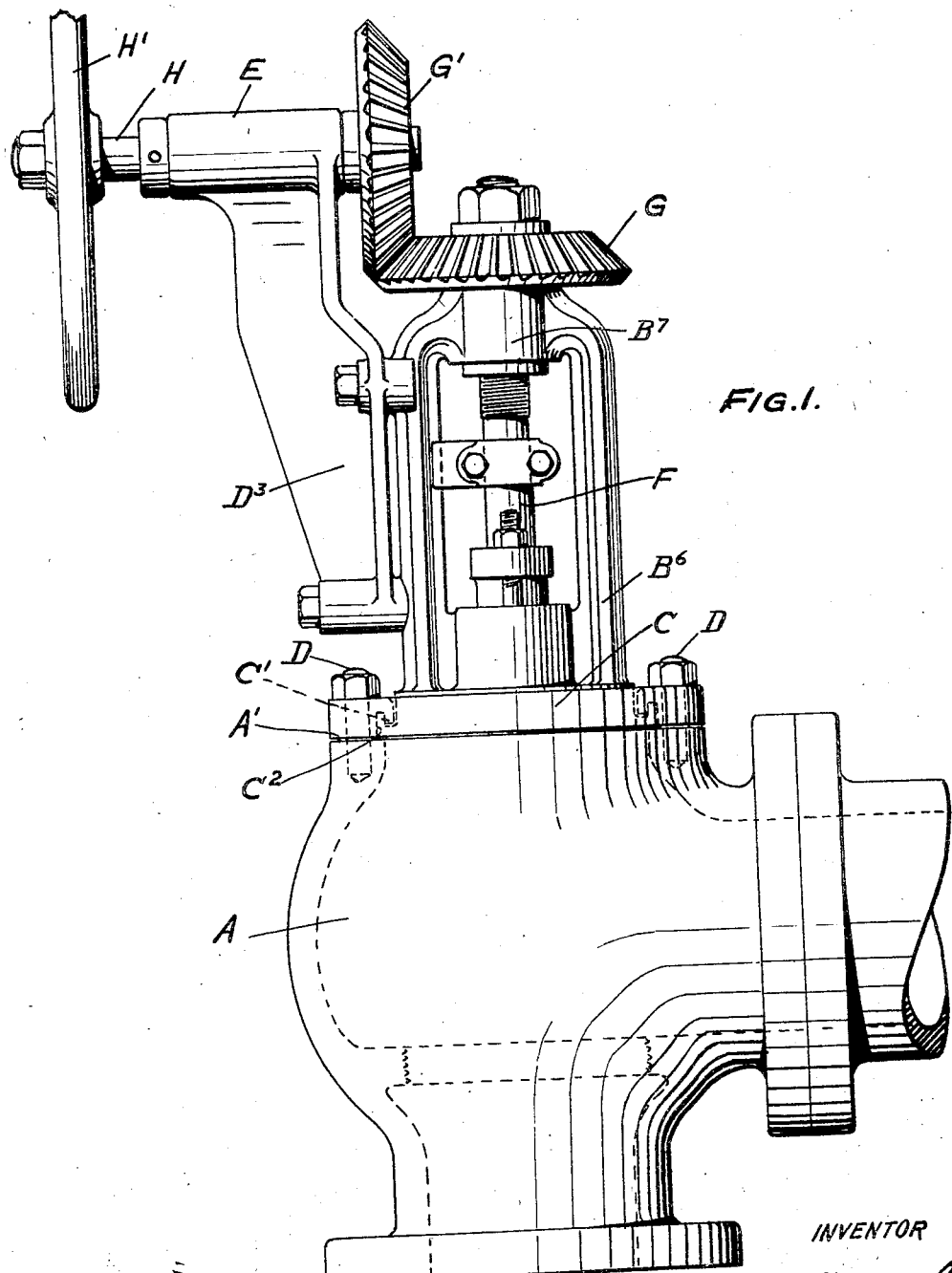

WITNESS:  
INVENTOR  
Paul W. Knauf  
BY  
his ATTORNEY

Aug. 26, 1924.
P. W. KNAUF
GEAR ACTUATED VALVE
Filed Jan. 19, 1920
1,506,433
3 Sheets Sheet 3
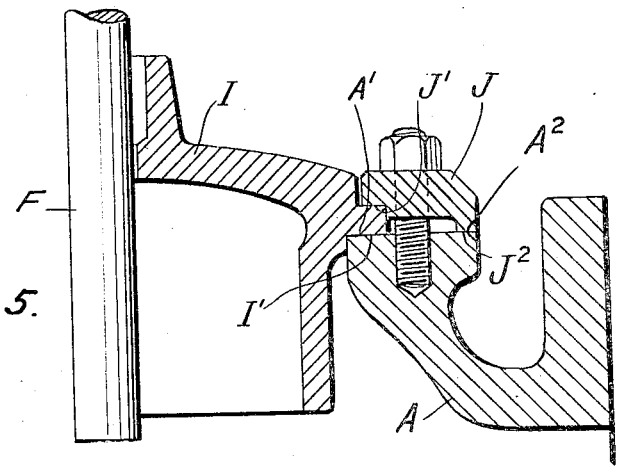
FIG. 5.
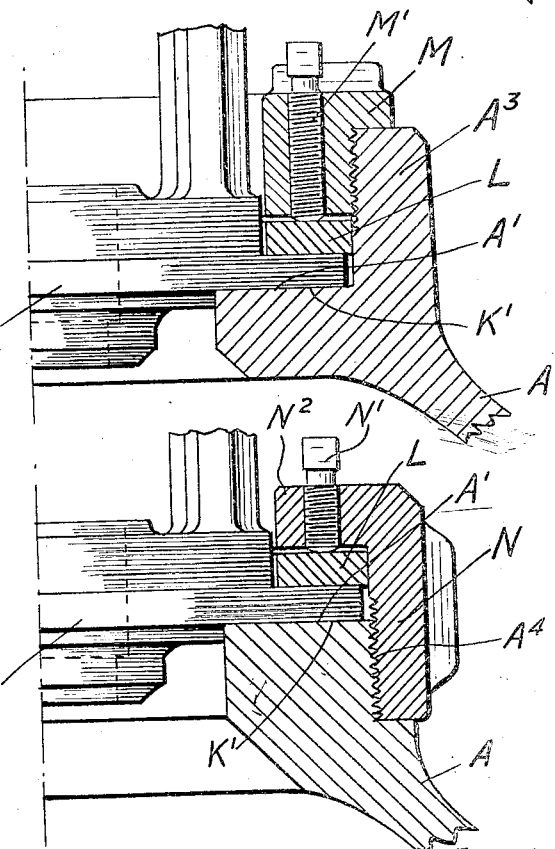
FIG. 6.
FIG. 7.
WITNESS:
INVENTOR
BY
ATTORNEY.

Patented Aug. 26, 1924.

1,506,433

UNITED STATES PATENT OFFICE.

PAUL W. KNAUF, OF CYNWYD, PENNSYLVANIA, ASSIGNOR TO SCHUTTE & KOERTING COMPANY, OF PHILADELPHIA, PENNSYLVANIA, A CORPORATION OF PENNSYLVANIA.

GEAR-ACTUATED VALVE.

Application filed January 19, 1920. Serial No. 352,497.

*To all whom it may concern:*

Be it known that I, PAUL W. KNAUF, a citizen of the United States of America, residing in Cynwyd, county of Montgomery, and State of Pennsylvania, have invented a certain new and useful Improvement in Gear-Actuated Valves, of which the following is a true and exact description, reference being had to the accompanying drawings, which form a part thereof.

My invention relates to valves of large size such as are used for steam turbine control, and of the kind in which gear wheels are utilized for actuating the valve, and the object of my invention is to so construct and organize the valve structure as to provide for practically any convenient angular adjustment of the actuating gears with reference to the valve casing.

The nature of my improvements will be best understood as described in connection with the drawings in which they are illustrated and in which—

Figure 1 is an elevation of a valve constructed in accordance with my invention.

Figures 5, 6 and 7 are elevations partly in section illustrating various modifications in the construction and makeup of the clamping mechanism which may be used in valves embodying my invention.

Figure 2:
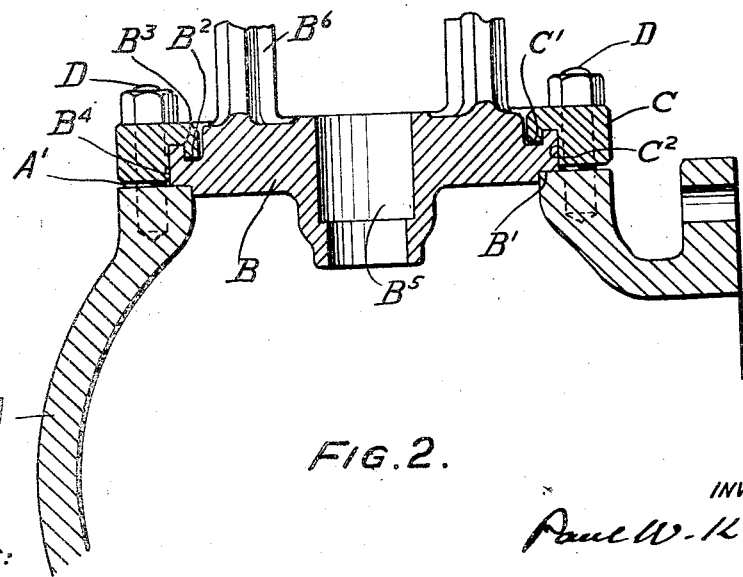
Figure 2 is a sectional elevation through the top of the valve casing, the cover and the clamping ring as shown in Figure 1.

A is valve casing of ordinary construction having an opening in its top for the insertion and removal of the valve, which opening is surrounded by an annular seat indicated at A'. B indicates the cover for closing this opening, which is formed with an annular seat indicated at B' adapted to rest upon the annular seat A', but not, as shown in Fig. 2, to entirely cover it. Preferably, and as shown in Fig. 2, the cover B has formed on its upper surface an annular groove $B^2$, $B^3$ indicating the outer wall of this groove and $B^4$ the angular peripheral surface of the plate B. $B^5$ indicates the hole formed through the plate for the passage of the valve stem, $B^6$ a bearing supporting bracket arising from the top of the cover B and supporting the upper bearing $B^7$, in which is swivelled a nut which engages a threaded portion of the valve stem. C is a clamping ring formed, as shown, with a downwardly extending annular rim C' adapted to enter the groove $B^2$ and rest against the outer wall $B^3$ of this groove. A depending wall $C^2$ of the ring is adapted to rest against the annular periphery $B^4$ of the collar and the ring is formed with bolt holes extending through it, as shown, and is held in place by a series of bolts, D, D, etc., the lower ends of which screw into the top of the valve casing, as shown.

Figures 3, 4:
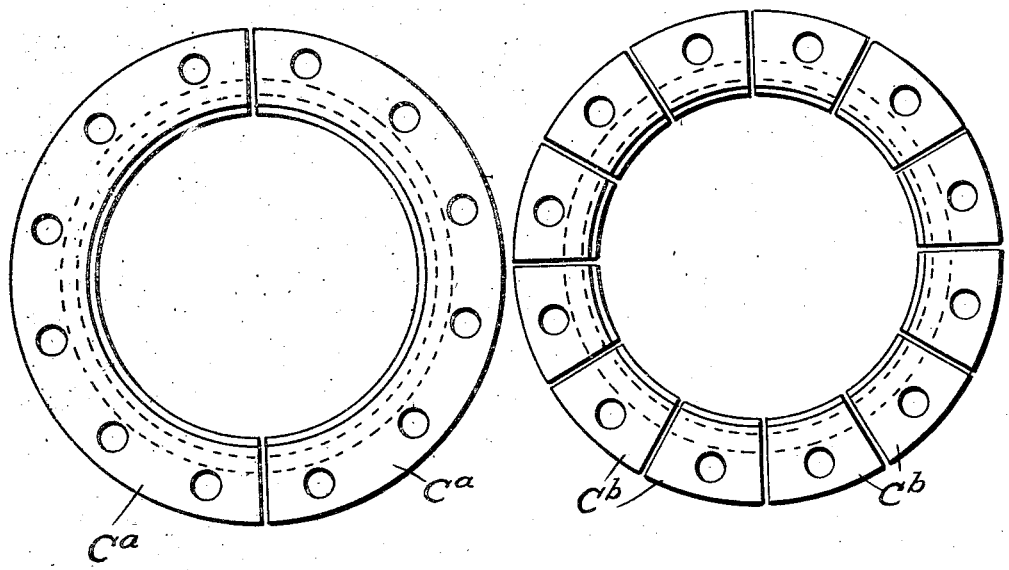
Figures 3 and 4 are plan views of clamping rings illustrating how they can be made up in sectional parts.

Where, for any reason, it is impracticable or inconvenient to use a solid ring C, the ring may be made up in sections; thus as indicated in Fig. 3 the ring is made up of two sections $C^a$, $C^a$, and, the ring may conveniently be made in still smaller sections, or, as illustrated in Fig. 4, the ring may be made up of multiple series of sections $C^b$, $C^b$, etc., each having a single bolt hole formed through it.

Returning to the construction shown in Fig. 1, $D^3$ is a bracket secured to the bracket $B^6$ and carrying the bearing E for the shaft H on which, as shown, is secured a hand actuating wheel H' and a gear wheel G' which meshes with a gear wheel G, which engages and rotates the valve spindle F.

Referring to the modified construction shown in Fig. 5, A, as before, indicates the valve casing formed with an annular seat $A^2$ around the opening in its top, and I indicates its cover having an annular flange I' adapted to be seated on the seat $A^2$. J indicates a clamping ring having an annular seat portion J' which rests upon a seat formed on the cover, and another annular seat $J^2$ which rests upon the seat $A^2$ of the casing, the ring being, as in the construction shown in Fig. 2, secured to the valve casing by means of bolts.

In the construction shown in Fig. 6 the casing A, in addition to having a seat A', is provided with an upwardly extending internally threaded rim $A^3$. The valve cover here indicated at K has a seat portion K' which rests upon the seat on the casing and has resting upon its top an annular ring L. M is an annular nut screwing into the extension $A^3$ and having formed in it threaded perforations into which screw bolts M' which rest upon the ring L.

In the construction shown in Fig. 7 the casing A, in addition to having the seat A', is formed with an annular threaded portion A⁴ lying below the seat, the cover as in the construction shown in Fig. 6 as lying upon a flange, the annular ring L, which is here held in place by means of an annular nut N screwing on the threaded portion A⁴ of the casing and formed with an inwardly extending flange N², formed with threaded bolt holes into which screw the bolts N' which clamp the ring L against the flange of the cover.

It is, of course, obvious that in all of the constructions illustrated and above described, the cover with the brackets and valve actuating gears secured to it can be given any desired angular adjustment so that the valve actuating shaft H can be led away from the valve in any desired direction and in this way my valves are adapted for more general and convenient use than any other constructions known to me.

While clamping rings for holding the cover in place may be made in many ways, and I have illustrated several plans for the construction and holding down of such rings I believe that the construction shown in Figs. 1 and 2 is best adapted for my purpose and for the maximum utilization of the holding down power of the bolts used in securing the cover to the top of the casing.

Having now described my invention, what I claim as new and desire to secure by Letters Patent, is:

1. In a valve of large size substantially as described, a valve casing having an opening for the insertion of a valve and an annular seat surrounding said opening, in combination with a cover having an annular seat adapted to rest on the seat surrounding the opening, gear wheels for actuating the valve spindle supported on the cover, a clamping ring extending over the edge of the cover and means secured to the valve casing operating to draw said clamping ring down on the edge of the cover without rubbing contact.

2. In a valve of large size substantially as described, a valve casing having an opening for the insertion of a valve and an annular seat surrounding said opening, in combination with a cover having an annular seat adapted to rest on the seat surrounding the opening, and an annular groove formed around its outer edge, gear wheels for actuating the valve spindle supported on the cover, a clamping ring having an annular downwardly turned hook adapted to enter the groove in the cover and an annular shoulder adapted to rest against the outer rim of the cover and bolts securing said clamping ring to the casing.

3. In a valve of large size substantially as described, a valve casing having an opening for the insertion of a valve and an annular seat surrounding said opening, in combination with a cover having an annular seat adapted to rest on the seat surrounding the opening, and an annular bearing surface for a clamping ring formed around its outer edge, gear wheels for actuating the valve spindle supported on the cover, a clamping ring the inner edge of which extends over said bearing surface and bolts securing said ring to the casing.

4. In a valve of large size substantially as described, a valve casing having an opening for the insertion of a valve and an annular seat surrounding said opening, in combination with a cover having an annular seat adapted to rest on the seat surrounding the opening and an annular bearing surface for a clamping ring formed around its outer edge, gear wheels for actuating the valve spindle supported on the cover, a segmental clamping ring the inner edge of which extends over said bearing surface and bolts securing the segments of said ring to the casing.

5. In a valve structure as described, as a device for securing a circular cover on an annular seat a clamping ring adapted to extend over the edge of the cover and means acting between the ring and seat for drawing the ring directly downward against the cover edge without rotative movement.

6. In a valve structure as described, as a device for securing a circular cover on an annular seat a clamping ring adapted to extend over and outside of the edge of the cover and bolts between the ring and seat for drawing the ring into clamping contact with the cover.

7. In a valve structure as described, as a device for securing a circular cover on an annular seat a clamping ring adapted to extend over the edge of the cover and formed with a downwardly extending hook adapted to enter a groove in the cover and bolts operating between the ring and seat for drawing the ring into clamping contact with the cover.

8. In a valve structure as described, as a device for securing a circular cover on an annular seat a segmental clamping ring adapted to extend over the edge of the cover and means acting between the ring and seat for drawing the ring directly downward against the cover edge without rotative movement.

PAUL W. KNAUF.